United States Patent [19]
Capdevielle

[11] 3,828,555
[45] Aug. 13, 1974

[54] POWER PLANT FOR VARIOUS VEHICLES

[75] Inventor: Pierre Capdevielle, Garches, France

[73] Assignees: Jean-Loup Giros, Paris; Marcel Capdevielle, Saint Georges Sur Cher, both of, France; part interest to each

[22] Filed: Mar. 23, 1972

[21] Appl. No.: 237,395

[30] Foreign Application Priority Data
Mar. 24, 1971 France .............................. 71.10346
Dec. 21, 1971 France .............................. 71.45900

[52] U.S. Cl..................... 60/413, 60/416, 60/427, 69/483
[51] Int. Cl.............................................. F15b 1/02
[58] Field of Search ............ 60/413, 414, 415, 416, 60/418, 425, 483, 484, 427

[56] References Cited
UNITED STATES PATENTS

| | | | |
|---|---|---|---|
| 900,342 | 10/1908 | Ashley | 60/418 |
| 1,156,817 | 10/1915 | Rich | 60/483 |
| 1,349,924 | 8/1920 | Swanson | 60/483 |
| 2,023,524 | 12/1935 | Heaton | 60/425 X |
| 2,170,890 | 8/1939 | Allen | 60/415 X |
| 2,370,526 | 2/1945 | Doran | 60/483 X |
| 2,374,588 | 4/1945 | Doran | 60/425 |
| 2,827,763 | 3/1958 | Govan et al. | 60/414 |
| 3,018,628 | 1/1962 | Pomper | 60/413 X |

*Primary Examiner*—Edgar W. Geoghegan
*Attorney, Agent, or Firm*—Gottlieb, Rackman, Reisman & Kirsch

[57] ABSTRACT

In this power plant for self-propelled vehicles two pipelines are inserted between a high-pressure tank and a low-pressure tank containing hydraulic fluid. A hydraulic motor is inserted in the first pipe line and is adapted to actuate the driving shaft of the vehicle through a freewheel coupling. A motor-pump unit is inserted in the other pipe line. This motor-pump unit has a relatively low-rated power output and is continuously operating at the same speed. This invention is advantageously applicable to automotive vehicles intended for service requiring frequent stops.

20 Claims, 10 Drawing Figures

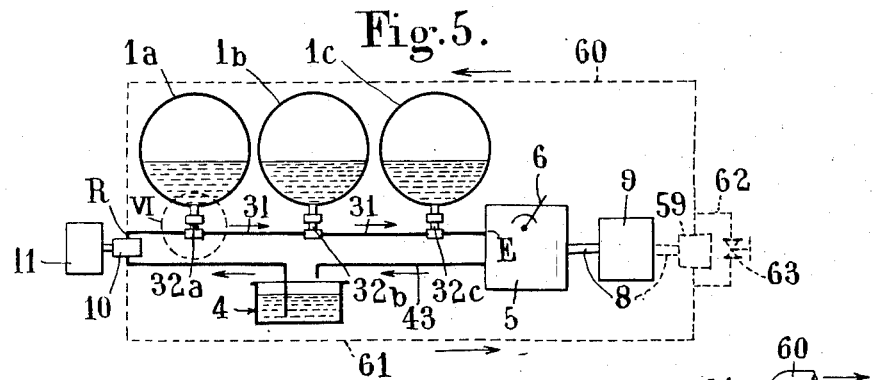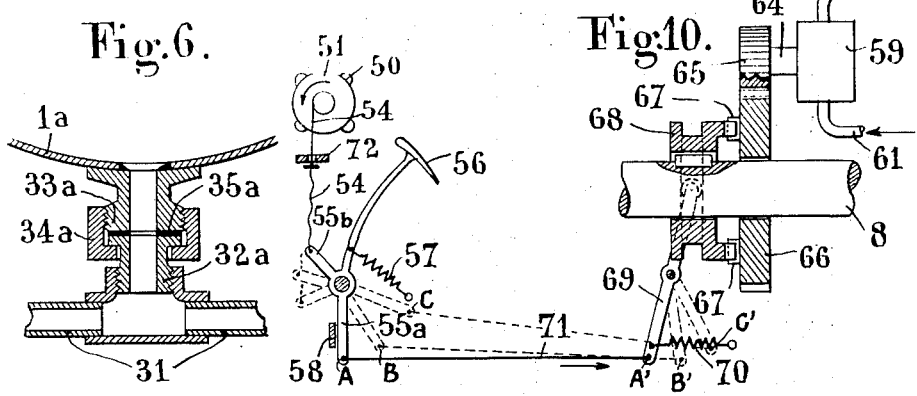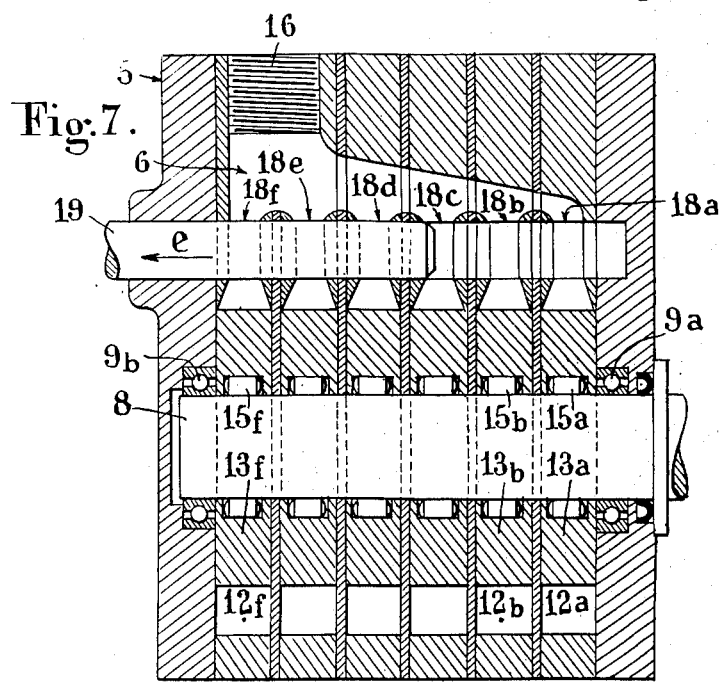

POWER PLANT FOR VARIOUS VEHICLES

BACKGROUND OF THE INVENTION

1. Field of the Invention:

The present invention relates in general to power plants for miscellaneous vehicles, notably automotive vehicles intended for intermittent service or frequent stops.

2. Description of the prior art:

As is well known, motor vehicles operate under constantly varying speed conditions according to the momentary driving or traffic conditions with which the vehicle is confronted. In fact, known variable-ratio transmissions cannot provide torque conversion ratio variation ranges sufficient to enable the vehicle to be driven by a constant speed motor. Conventional engines, used to power motor vehicles notably internal combustion engines, operate at variable speeds, but these motors have a rather poor efficiency, a noisy operation and they release to the atmosphere noxious substances due to and incomplete combustion resulting in a source of pollution. On the other hand, it is also known that motors capable of operating under different loads at a substantially constant speed, such as electric motors, are less than applicable for automotive vehicles.

Power plants, notably for self-propelled vehicles, are already known which comprise respectively a high-pressure reservoir or group filled with hydraulic fluid and a low-pressure reservoir or group filled with hydraulic fluid, at least one first pipe line having inserted therein at least one hydraulic motor operatively connected to the power shaft of the vehicle, and at least one second pipe line in which at least one motor-pump unit is inserted.

In power plants of this known type, the motor of the motor-pump unit, consisting as a rule of an internal combustion engine of conventional type, operates under variable speed conditions and adapts itself automatically to the speed of the hydraulic motor controlled in turn by the driver of the vehicle. Still, these power plants suffer from all the well known inconveniences of internal combustion engines operating under variable-speed conditions, i.e., rather poor average efficiency, noisy operation, and release of incomplete combustion residues to the atmosphere, notably of pollution elements. In addition, the power plants cannot utilize engines operable under nearly constant-speed conditions, such as electric motors.

SUMMARY OF THE INVENTION

These various disadvantages of power plants broadly described hereinabove are eliminated according to the present invention by providing a power plant in which at least one freewheel coupling is inserted between the output shaft of the hydraulic motor and the power or driving shaft of the vehicle. The motor-pump unit has a power rating corresponding to only one fraction of the maximum power output of said hydraulic motor and operates constantly, even during temporary stoppages of the vehicle, at a strictly constant speed independent both of the hydraulic motor speed and of the reaction torque applied to the power or driving shaft of the vehicle.

The invention provides several advantages. Since the motor of the motor-pump unit operates at a constant speed, it can be chosen to be either a motor operable only at said speed, for example an electric motor, or a motor capable of operating at variable speeds, such as a conventional internal combustion engine. If an internal combustion engine is chosen, the constant velocity of operation of the engine may be selected to derive the best possible efficiency and the most noiseless operation thereof as well as the lowest possible atmospheric pollution by the exhaust gas. In the specific case of a vehicle to be operated with relatively frequent stops, the motor is chosen to have a rated power output (for the selected constant speed) considerably lower than the momentary power outputs necessary for starting the vehicle from rest or for driving along very steep uphill road sections, the ratio of the rated power output to the necessary maximum instantaneous power output being selected to decrease as the ratio of the stopping times to the driving times of the vehicle increases. The total efficiency is further improved by the fact that, during stops, the hydraulic motor does not absorb any power, although the motor-pump unit operates continuously. Furthermore, the global efficiency of the power plant according to this invention is improved by the fact that the provision of freewheel couplings eliminates any waste of power for preserving the acquired speed of the vehicle. In addition, the power plant according to this invention eliminates the need for a clutch, thus providing the dual advantage of a lower cost and a simplified driving. Finally, the power unit provides a constantly available high starting torque, even after a prolonged stop of the motor-pump unit, provided only that the high-pressure filling level is sufficient when the vehicle is brought to a standstill. Accordingly, with a power unit according to the present invention, the "cold starting" problem is reduced and/or eliminated.

BRIEF DESCRIPTION OF THE DRAWINGS

Various embodiments of the power plant of according to this invention will now be described, by way of example, with reference to the attached drawing, the invention being applied more particularly to automotive vehicles intended for operation with relatively frequent stops. In the drawing:

FIG. 5 illustrates diagrammatically a modified form of embodiment of the power plant illustrated in FIG. 1;

FIG. 6 is a sectional view showing the detail designated by the reference symbol "VI" in FIG. 5 and enclosed in a dash-line circle;

FIGS. 7 and 8 are a section and a diametral plane, respectively, showing two modified forms of embodiment of the hydraulic motor illustrated in FIGS. 2 and 3, respectively;

FIG. 10 illustrates diagrammatically, in fragmentary section, an engine-braking device adapted to be easily and optionally fitted to the power plant of this invention.

DESCRIPTION OF THE PREFERRED EMBODIMENT

Figure 1:
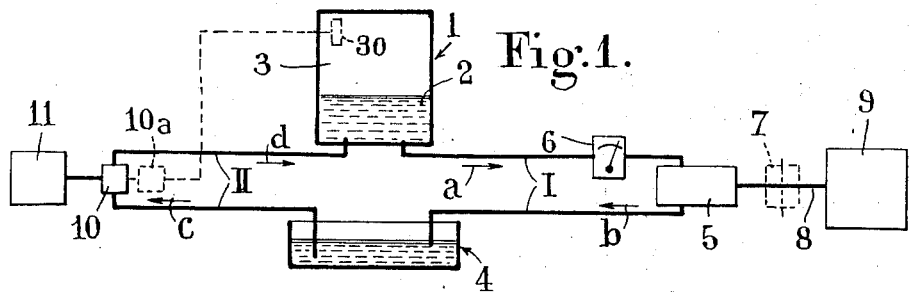
FIG. 1 is a block diagram illustrating the basic principle of operation of the power plant according to this invention.

The power plant for automotive or selfpropelled vehicles according to this invention comprises, as illustrated in FIG. 1, a so-called "high-pressure" (HP) reservoir 1, closed completely and containing in its lower portion a variable quantity 2 of a suitable hydraulic fluid. Overlying this fluid in the HP reservoir 1 is a buffer gas volume 3 consisting for example of nitrogen. The bottom of this HP reservoir 1 is connected via two pipe lines I and II to another reservoir 4, constituting the "low-pressure" or LP reservoir which, in this embodiment is an open-top vessel, i.e., connected directly to the atmosphere. A hydraulic motor 5 is inserted in the first pipe line I. This motor 5 is in series with a control valve 6 having its control member within easy reach of a hand or foot of the driver of the vehicle. In the embodiment illustrated in FIG. 1, the hydraulic motor 5 drives the power or driving shaft 8 of the vehicle through the intermediary of a freewheel coupling (not shown in FIG. 1). The block 9 designates the various elements of the final drive of the vehicle, such as wheels or propellers, etc.., driven from the power shaft 8. In the second pipe line II, a pump 10 is inserted. This pump 10, of a type consistent with the hydraulic fluid utilized, is driven from a motor or engine 11 of any suitable type.

The power plant illustrated diagrammatically in FIG. 1, in the specific case of an automotive vehicle, operates as follows:

When the driver of the vehicle sets the adjustment member of control valve 6 in the position corresponding to the maximum output in pipe line I, the hydraulic fluid flows from the bottom of the HP reservoir 1 through this line I in the direction of the arrow $a$ and through the hydraulic motor 5, thus causing this motor to apply the maximum torque to power shaft 8. This hydraulic fluid is discharged from motor 5 into the low-pressure (LP) reservoir 4 via pipe line I in the direction of the arrow $b$. The value of this maximum torque exerted on the power shaft 8 of the vehicle is selected to be sufficient for starting the vehicle from rest and, when the vehicle has attained the speed desired by the driver, the latter sets the control valve 6 in a position reducing the flow in pipe line I. To stop the vehicle, the driver restores the setting of control valve 6 to the position in which said valve cuts-off the pipe line I, so that the driving shaft 8 is no longer driven. On the other hand, the motor 11 of the motor-pump unit, which was started jointly with the first or initial starting of the vehicle, remains in operation at a constant speed during both the operative and nonoperative operation of the hydraulic motor 5. Motor 11 causes the pump 10 to create in pipe line II a constant circulation of hydraulic fluid in the direction of the arrows $c$ and $d$, i.e., from the LP reservoir 4 to the bottom of the HP reservoir 1.

The rated power of the motor-pump unit 10,11 is selected as a function of the ratio of stopping times to driving times of the vehicle involved, so that the level of the hydraulic fluid 2 in the high-pressure reservoir 1 cannot drop below a predetermined level in which the hydraulic motor 5 and pump 10 might fail to operate for want of sufficient fluid (unpriming). Thus, the motor 11 is so dimensioned that it can deliver the necessary rated power at constant speed under the most favourable operating conditions from the point of view of obtaining the best possible efficiency, the lowest possible noise level and the minimal amount of residual unbrunt fuel in the exhaust gas in order to reduce atmospheric pollution. It is clear that in the case of a vehicle normally operated with very frequent stops (such as light weight delivery vans, postal service vehicles, or garbage or refuse collection vehicles, town transport vehicles, etc.), the rated power of motor 11 may be selected to be considerably lower than the maximum instantaneous power required from the hydraulic motor 5 for starting the vehicle from rest or driving up very steep gradients. Since the motor 11 operates at a constant speed, an electric motor may be used, powered from storage batteries or solar cell batteries.

The high efficiency of the power plant according to this invention is due not only to the fact that the motor of its motor-pump assembly operates at a substantially constant speed, but also to the fact that the freewheel coupling, which transmits to the power shaft of the vehicle the output of the power unit hydraulic motor, eliminates power consumption by this hydraulic motor when the latter is inoperative, without requiring the stoppage of the motor-pump assembly, and further eliminates power consumption which would otherwise be necessary for enabling this hydraulic motor to adapt its speed to the running speed of the vehicle. The of the power unit illustrated in FIG. 1 and described hereinabove is furthermore particularly advantageous, since it eliminates both the clutch and the variable-ratio transmission mechanism.

Figure 3:
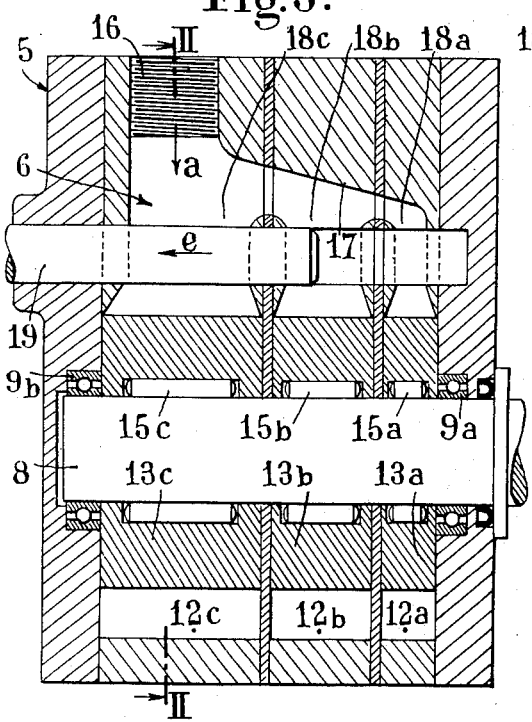
FIG. 3 is a section taken along the line III—III of FIG. 2.
Figure 2:
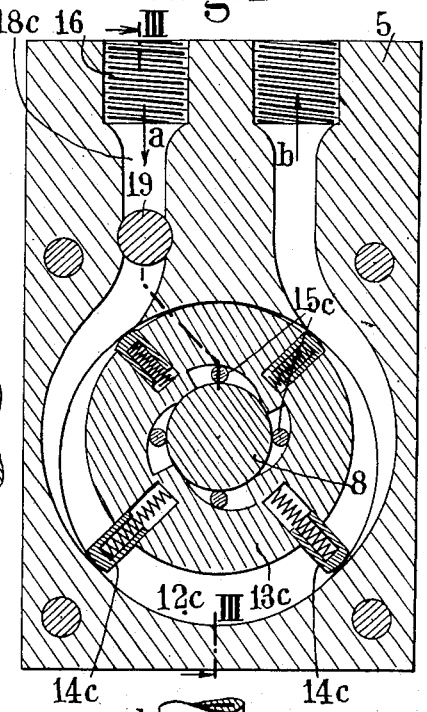
FIG. 2 is a diagrammatic illustration of a typical form of embodiment of the hydraulic motor incorporated in the power plant of FIG. 1, shown in section taken at right angles to its output shaft.

In this embodiment, the hydraulic motor 5, illustrated in FIGS. 2 and 3 includes, the control valve 6 which is incorporated in this motor 5 in the form of a spool valve to be described presently. The hydraulic motor 5 comprises three stages consisting essentially of three cylindrical, fluid-tight chambers 12$a$, 12$b$ and 12$c$, respectively, formed in the same casing. The three chambers receive therethrough, for rotation about an eccentric axis, the end portion of the driving shaft 8 which is mounted in a pair of ball-bearings 9$a$, 9$b$. In each one of the three chambers, rotors 13$a$, 13$b$ and 13$c$, respectively, are provided in a manner known per se with radially sliding vanes 14$c$ urged outwardly by coil compression springs (FIG. 2). The rotors are mounted on the corresponding portion of the shaft portion 8 through freewheel couplings 15$a$, 15$b$ and 15$c$, respectively. As clearly shown in FIG. 3, the axial lengths of chambers 12$a$ to 12$c$, and also of the rotors 13$a$ to 13$c$, have stepped values with suitable ratios for example 1 to 2 to 3. Under these conditions, the operative surfaces of the vanes carried by the three rotors have mutual ratios approximating these values. The chambers 12$a$ to 12$c$, normally isolated in a fluid-tight manner from one another, may be connected at wil to that section of the first pipe line I which extends from the first HP reservoir 1 via the spool valve distributor 6. The spool valve distributor includes an inlet part 16 which receives the high-pressure fluid flowing in the direction of the arrow a, a divergent 17 which extends between the inlet port 16 and three orifices 18$a$, 18$b$ and 18$c$ which open into chambers 12$a$, 12$b$ and 12$c$, respectively. The cross-sectional passage areas of the orifices correspond substantially to the mutual ratios of the axial lengths of said chambers. The spool valve proper comprises a stem 19 having one end adapted to slide without play in a corresponding cylindrical bore parallel to the driving shaft 8. When the sliding stem 19 is moved in the direction of the arrow e, due to the action exerted by the driver of the vehicle on a suitable control member disposed within easy reach of the driver and adapted to actuate through suitable linkage means (not shown) the other end (not shown) of said stem 19, the orifices 18a, 18b, 18c are opened in succession and the corresponding chambers 12a, 12b and 12c are supplied with high pressure (HP) hydraulic fluid.

In the example illustrated, the active surface of the vanes of the three rotors 13a to 13c are substantially in the ratios 1 to 2 to 3, and the three stages of the hydraulic motor of FIG. 3, when they are loaded with the HP fluid, exert on shaft 8 torques which are substantially in these ratios. Since the distributor 6, according to the axial position of its stem 19, causes the hydraulic fluid to be distributed either to stage 12a alone, or in parallel to stages 12a and 12b, or in parallel to stages 12a, 12b and 12c, the hydraulic motor can exert on shaft 8 torques which are likewise in the ratios of 1 to 3 to 6, according to the position of internal distributor 6. When the stem 19 of the distributor 6 is in its innermost position (at the right as seen in FIG. 3), the three orifices 18a, 18b and 18c are tightly sealed, none of the stages of said hydraulic motor 5 are fed with fluid under pressure and the motor is stopped, the vehicle continuing its drive. When the stem 19 is moved in the direction of the arrow e so as to uncover completely the three orifices 18a to 18c, the hydraulic motor 5 exerts the maximum torque on shaft 8 permitting the starting of the vehicle and its fast acceleration, or, if the vehicle was already in motion, the driving of this vehicle along a steep uphill road. When the stem 19 of valve 6 is moved back to the right and set in a position in which it closes only orifice 18c, the hydraulic motor 5 exerts a lower torque on shaft 8 but permits a further increment in the speed previously attained by the vehicle. Finally, when the stem 19 is moved in the direction opposite to that of said arrow e to the position in which only orifice 18a is free, the low torque exerted by the hydraulic motor 5 to the driving shaft 8 is just sufficient for either preserving the speed attained by the vehicle or driving the vehicle at low speed.

Figure 4:
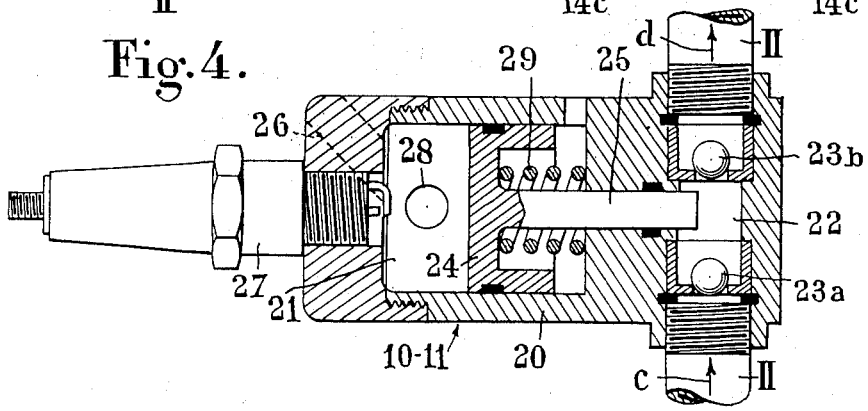
FIG. 4 is a fragmentary diametral section of a typical form of embodiment of the motor-pump unit of the plant of FIG. 1.

The motor-pump assembly 10, 11 is illustrated in FIG. 4 of the drawing and comprises essentially a casing 20 of substantially cylindrical configuration, in which are formed, at a first end, a power chamber 21 of substantially cylindrical configuration and, at the opposite end, a pumping chamber 22 which is disposed in the second pipe line II (FIG. 1) of the power unit. A suction valve 23a and a delivery valve 23b, for example, both of the ball type cooperate with the pumping chamber 22. The motor-pump assembly of FIG. 4 further comprises a twin-body single piston, i.e. a piston body 24 of relatively large diameter slidably mounted in said power chamber 21 and a piston body 25 of relatively small diameter, the latter forming the rod of piston body 24 with its end acting as a plunger piston engaging the pumping chamber 22 between the pair of ball valves 23a and 23b. In FIG. 4 the various seals necessary for isolating the two chambers 21 and 22 are shown diagrammatically. In this embodiment, the power chamber 21 is an explosion chamber in which a combustible gaseous mixture is introduced through a passage 26 from well-known means, notably a valve, and is ignited by means of a spark plug 27, the burnt gas escaping through an exhaust port 28 also provided with a valve (not shown). A spring 29 normally urges the twin-body piston 24,25 to the position illustrated in FIG. 4. The motor-pump unit is particularly advantageous since, as no mechanical transmission member is provided between the power piston body 24 and the plunger piston body 25 producing the pumping effect, the motor-pump unit is economical in construction, reliable, has a long useful life, has easy maintenance and provides noiseless operation.

The above-described embodiment of the power unit of this invention can lend itself to many different modifications most of which will readily occur to those conversant with the art without departing from the basic principle of the invention. Thus, the hydraulic motor may be a gear motor, a vane motor, a linear-piston or rotary-piston motor, a conjugated-profile motors, etc. The motor-pump unit may comprise a hydraulic pump of any known and suitable type, such as rotary pump, vane pump, gear pump, linear or rotary piston pump, etc. as well as a motor of one of the known types such as conventional internal combustion engine, diesel or compression-ignition engine, electric motor, etc. For equipping a small delivery or collecting van, even a small gasoline engine of the type utilized for motorized bicycles, may be used.

The number and ratios of the torques produced by the different stages of the hydraulic motor are a matter of choice as is of the distributor, which may, if desired, be separate from the motor (as shown in FIG. 1). The control valve, if required, may be provided for starting and stopping the hydraulic motor only. Further, the hydraulic motor (as at 5, FIG. 1) may comprise a single stage, and with a variable ratio transmission (shown in the square dash-line contour 7 of FIG. 1) inserted between the output shaft of the hydraulic motor and the driving shaft 8 the vehicle. Since the transmission 7 is adapted to provide a wide range of torque conversion ratio variations, the hydraulic motor 5 may produce a constant torque, the control valve 6 acting only as a means for starting and stopping this motor. The power output of this motor may also be adjusted by the control valve 6 (FIG. 1), actuated by means of a control member within easy reach of the driver of the vehicle, with the control member controlling the variable ratio transmission 7 (FIG. 1). Finally, the power plant according to this invention may comprise a plurality of hydraulic motors fed in parallel through the first pipe line 1 for driving either a single power shaft of the vehicle or separate shafts corresponding, for example, to separate propeller shafts or members. A plurality of motor-pump assemblies operating in parallel may also be provided. Thus, each hydraulic motor and each of the motor-pump units may consist, in turn, of a combination of motors and pumps of various and possibly different designs. Similarly, the power plant according to this invention may be mounted on a vehicle concurrently with another motor or engine of conventional design for driving the propelling shaft or shafts through clutches and/or variable-ratio transmission mechanisms, the conventional motor being used for reinforcing or replacing the action of the power unit of this invention when the vehicle must be operated without frequent stops, for example, on open roads.

In the embodiment illustrated in FIG. 1, the pressure of the buffer gas volume 3 (nitrogen), which overlies the hydraulic fluid volume 2, varies, under constant room temperature conditions, as a function of the level of the HP hydraulic fluid. More particularly, the pressure decreases continuously during the operation or actual driving time of the vehicle. This is caused by a lower output from the motor-pump assembly 10, 11 than the fluid output supplied to the hydraulic motor 5. Hence, hydraulic motor 5 is fed under a decreasing pressure so that, at a predetermined position of control valve 6, motor 5 exerts a decreasing torque on power shaft 8. Although the driver of the vehicle can easily keep the vehicle speed at a constant value by modifying the setting of control valve 6, However, it is also possible to provide in the pump 10 a device 10a for automatically adjusting the pump output as a function of the pressure prevailing in reservoir 1, as measured by a suitable pick-up device 30. By maintaining constant the product of pump output times reservoir pressure, the power output supplied by the engine 11, remains constant.

It is also possible to provide in the upper portion of HP reservoir 1, a buffer gas volume 3 having a pressure substantially independent of the level of hydraulic fluid 2, by using as said gaseous volume a vapor of a suitable substance, in a state of equilibrium with a predetermined amount of the same substance in the liquid state. It is known that under these particular conditions, the pressure of the gaseous volume 3 depends only on its temperature. In the case of a LP reservoir 4 connected directly to the atmosphere, it is possible to create in the HP reservoir 1 a gaseous buffer volume under a relatively high pressure remaining substantially constant at room temperature, by using gas freon vapor in equilibrium with a small amount of liquid freon as the buffer gas. To obtain still higher constant pressures, it is possible to associate a thermostat with the HP reservoir 1 by using well-known means, in order to keep the buffer gas volume 3 at a strictly constant value whereat said gas has the desired high pressure. As the buffer gas volume in the HP reservoir 1, it is possible to use a substance, such as freon, which, in the gaseous and/or liquid state, is not miscible with the hydraulic fluid used in the reservoir.

Since most of the component elements of the modified form of embodiment of the power plant according to this invention, which is illustrated in FIG. 5, do not differ from the homologue elements of the power plant illustrated in FIG. 1, similar components are designated by the same reference numerals. In the modified structure illustrated in FIG. 5, the delivery port R of pump 10 in the motor-pump assembly is connected to the input E of hydraulic motor 5 through at least one duct 31 (corresponding to the upper elements of the aforesaid pipe lines I and II of FIG. 1). Duct 31 comprises a number of branch sections 32a, 32b, 32c connected to the bottoms of corresponding HP fluid-tight reservoirs 1a, 1b, 1c, preferably of the same capacity. As illustrated in FIG. 6, the bottom of each HP reservoir, such as 1a, is detachably connected to the corresponding branch pipe 32a from the main duct 31 by a pipe fitting 33a welded to the bottom of the corresponding reservoir. A flanged nut or union 34a connects the two corresponding pipes 32a and 33a via a suitable sealing gasket 35a. A balancing pipe interconnecting the upper portions, float-valves for preventing the complete draining of the reservoirs, self-sealing fittings for connecting the reservoirs to the main duct 31, etc. may also be included.

The application of the present invention to the construction of automotive vehicles having characteristics akin to those of the following different vehicles will now be described by way of examples:

Type A: A low-powered passenger car, mainly for town use;
Type B: A medium-size passenger vehicle;
Type C: A small delivery van or pick-up carrying about 1 ton;
Type D: A medium-duty commercial vehicle carrying a pay load of about 2 tons;
Type E: A heavy-duty commercial vehicle carrying a pay load of about 4 tons;
Type F: A medium-size bus;
Type G: A heavy-duty bus.

The present invention is directed neither to modifying nor improving these known vehicles, which are taken herein only as typical examples of current vehicles in order better to emphasize the advantages provided by the present invention when applied to vehicles through a very wide range of types and power outputs.

The following Table illustrates the various applications of the present invention:

TABLE

| | Type of Vehicle | | Units | A | B | C | D | E | F | G |
|---|---|---|---|---|---|---|---|---|---|---|
| 1 | Power output | | HP | 18 | 55 | 43 | 75 | 90 | 135 | 160 |
| 2 | Torque at driving wheel | in 1st gear | m.kg. | 43 | 100 | 200 | 400 | 620 | 1300 | 1450 |
| 3 | do. | in 2nd gear | do. | 25 | 66 | 100 | 190 | 300 | 800 | 820 |
| 4 | do. | in 3rd gear | do. | 17 | 47 | 65 | 110 | 180 | 500 | 515 |
| 5 | do. | in 4th gear | do. | 11.5 | 34 | 45 | 80 | 125 | 300 | 330 |
| 6 | do. | in 5th gear | do. | | | | | | 215 | |
| 7 | Max. speed | in 1st gear | km.p.h. | 21 | 36 | 18 | 18 | 15 | 9 | 9 |
| 8 | do. | in 2nd gear | do. | 36 | 54 | 33 | 36 | 30 | 18 | 18 |
| 9 | do. | in 3rd gear | do. | 60 | 80 | 54 | 60 | 54 | 30 | 36 |
| 10 | Cruising speed | in 4th gear (top) | do. | 80 | 120 | 80 | 80 | 70 | 54 | 60 |
| 11 | do. | in 5th gear (top) | do. | | | | | | 72 | |
| 12 | Max. torque required for driving up a 25% gradient with max. load | | m.kg. | 40 | 90 | 150 | 350 | 550 | 1200 | 1700 |
| 13 | Min. torque required for driving the vehicle (empty) on the flat | | do. | 3 | 6 | 6 | 20 | 20 | 70 | 100 |
| 14 | Total capacity of HP reservoirs | | litres | 50 | 100 | 100 | 200 | 300 | 400 | 600 |
| 15 | Volume of hydraulic fluid under a pressure of 100 to 200 bars (1,450 to 2,900 psi) | | do. | 25 | 50 | 50 | 100 | 150 | 200 | 300 |
| 16 | Power rating of motor-pump assembly | | HP | 2 | 5 | 5 | 10 | 10 | 10 | 10 |
| 17 | Motor-pump output under 150 bars (2,175 psi) | | lit.mn. | 5 | 13 | 13 | 25 | 25 | 25 | 25 |
| 18 | Torque produced by one stage of modular hydraulic motor | | m.kg. | 3 | 10 | 10 | 25 | 50 | 100 | 100 |
| 19 | Number of stages required | | | 13 | 9 | 15 | 14 | 11 | 12 | 17 |

In the above Table, lines 1 to 11 designate the main characteristics of the above-listed vehicles of types A to G, as equipped at present, i.e., comprising an internal combustion engine driving at least two road wheels through a clutch, for example of the friction disk type, and a generally mechanical gearbox providing four to five speeds, according to the type of vehicle contemplated.

Lines 12 to 19 of the same Table show the essential characteristics of power plants according to this invention for equipping the same vehicles, respectively, and providing performances equivalent to those of the known vehicles A to G. These power plants are preferably of the type illustrated in FIG. 5 and described hereinabove.

To obtain advantageous resulting from modular construction, the power plants according to the present invention are equipped preferably with motors wherein all the stages are identical, i.e., notably, motors wherein all the vane motors have not only the same diameter but also the same axial length. A motor of this type, conprising six identical stages, is illustrated diagrammatically in FIG. 7 of the drawing, in which the homologue elements also found in FIG. 3 are designated by the same reference numerals (the sectional view of this motor, taken through a plane perpendicular to its shaft 8, being exactly coincident with FIG. 2). In the specific case of a hydraulic motor having identical stages, each stage is so dimensioned that it is capable of producing the minimum torque necessary for driving the vehicle in its empty or unloaded condition on a flat surface, the value of this minimum torque being shown in line 13 of the above Table for the various types of vehicles involved. A spool-valve stem 19 is slidably mounted for motion in a direction parallel to the output shaft of motor 8 so as to uncover in succession the inputs or inlet ports of the various rotor chambers 18a to 18e. The hydraulic motor utilized must comprise identical number of identical stages at least equal to the ratio of the maximum torque necessary for driving the vehicle up a 25 percent gradient, under full-load conditions (line 12 of the above Table) to the above-defined minimum torque (line 13 of the Table). This necessary number of stages is shown in line 19 of the Table. A hydraulic motor of the type involved, comprising an identical number of stages within the range of, 10 to 20, is still of relatively low cost, since it consists simply of a stacking of identical members, as shown in FIG. 7. Further, its over-all dimensions remain very moderate in comparison with those of internal combustion engines equipping known vehicles of the above-mentioned type; in fact, a power plant suitable for equipping a vehicle having performances approximating those of the vehicle of type B may comprise only one hydraulic motor of the above-defined type, the motor casing being rectangular and about 70 × 110 mm in cross-section, with an axial length of about 120 mm.

Figure 8:
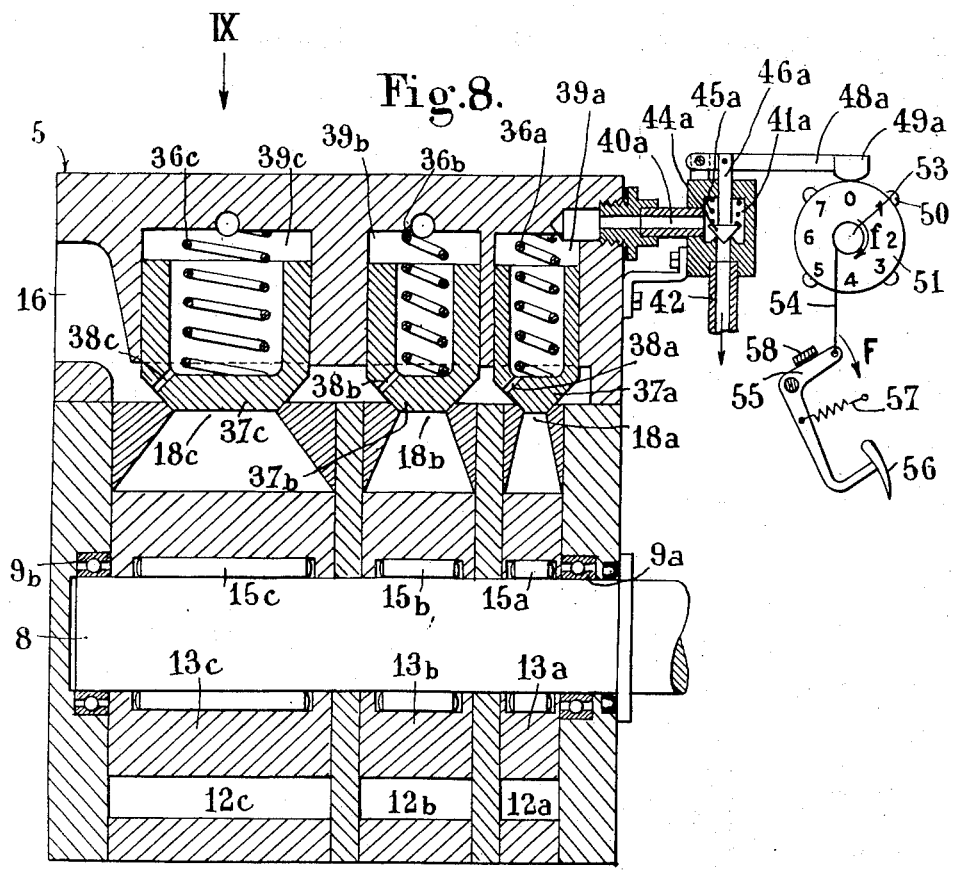
Figure 9:
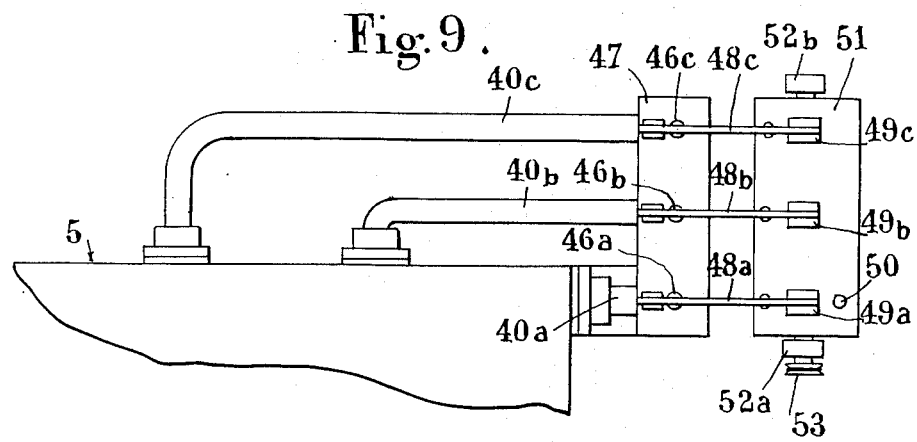
FIG. 9 is a fragmentary view taken in the direction of the arrow IX of FIG. 8.

A hydraulic motor of the type broadly described hereinabove may produce increasing torques of stepped values by providing, according to a typical feature of this invention, means responsive to the accelerator control member of the vehicle for establishing a direct communication between the hydraulic fluid input of the motor and the separate input of any one of the various rotor chambers or the separate inputs of a selected group of rotor chambers. FIGS. 8 and 9 illustrate a typical form of embodiment of a hydraulic motor of this character adapted to be incorporated in a power plant according to this invention. The motor shown in FIGS. 8 and 9 differs from the motor of FIG. 7 (corresponding parts have the same reference numerals) essentially by the following two features: first, it comprises only three rotors 13a, 13b, 13c, having stepped axial lengths according to the geometrical progression 1, 2, 4; second, the three orifices 18a, 18b and 18c, providing a direct communication between the input pipe 16 for introducing the hydraulic fluid into the motor 5 and the separate inputs of the various rotor chambers 12a, 12b, 12c, are bounded by lapped seats engaged by differential pistons 37a, 37b, 37c urged by springs 36a, 36b and 36c when the pressure balance on the two opposite faces of each one of these pistons has been established through the narrow passages 38a, 38b and 38c interconnecting said opposite faces. The corresponding chambers 39a, 39b and 39c of the differential pistons 37a to 37c are connected via passages 40a to 40c to other chambers such as 41a (FIG. 8). Chamber 41a communicates with a duct 42 connected, in turn, to the exhaust pipe of hydraulic motor 5 (43 in FIG. 5) and the chamber is adapted to be cut off by a monitoring valve, such as 44a, normally seated by a spring 45a provided with an upper control stem 46a. The three chambers, such as 41a, are formed in a common casing 47 secured to the motor 5. The control stems 46a to 46c of the monitoring valves have their ends projecting from said casing 47 and are pivotally connected to pivoted levers 48a to 48c. The free ends 49a to 49c of the pivoted levers are adapted to be lifted by studs 50 carried by the lateral surface of a cylinder 51 rotatably rigid with a shaft revolving freely in bearings 52a, 52b and normally urged by an elastic return torque in the direction of the arrow $f$ (FIG. 8) by suitable means, not shown. The end of the rotary shaft carries a grooved pulley 53 partially engaged by a cable 54 having its free end anchored to the pivoting arm 55 of the accelerator pedal 56 of the motor vehicle. When the pedal 56 is not depressed, a spring 57 holds the arm 55 in abutment against a fixed member 58, thus preventing any movement of cylinder 51 in the direction of the arrow $f$. The index numeral "0" designates the generatrix of cylinder 51 which is then engaged by the ends 49a to 49c of the pivoting levers 48a to 48c, said generatrix being free of any stud such as 50, whereby all the monitoring valves such as 44a are then closed. Also closed are the differential valves provided by pistons 37a to 37c respectively and their relevant seats. When the driver of the vehicle slightly depresses the accelerator pedal 56, the lever arm 55 pivots in the direction of the arrow F, pulling the cable 54 downwards, so that the cylinder 51 rotates in the direction opposed to that of arrow $f$. When the single stud 50 disposed along the generatrix "1" of cylinder 51 (FIG. 8) lifts the end 49a of pivoting lever 48a, the monitoring valve 44a is opened, thus causing a negative pressure to be exerted on the upper face of piston 37a automatically opening this piston and compressing spring 36a. Under these conditions, the hydraulic fluid under pressure flowing into the motor via the input pipe 16 around the pistons 37c and 37b retained by their relevant seats, penetrates into the chamber 12a of motor 5, via its orifice or port 18a. When the accelerator pedal is gradually depressed, the various generatrices numbered 2 to 7 of cylinder 51 are brought in succession beneath the ends 49a to 49c of pivoting levers 48a to 48c. The proper disposal of studs such as 50 on these various generatrices permits the opening of the three differential valves either separately or according to any desired or selected combination, so that torques of increasing values can be produced by the hydraulic motor 5, these values being stepped according to the geometrical progression 1, 2, 3, 4, 5, 6 and 7. If the shortest rotor (13a) of motor 5 is dimensioned to produce a torque of 25 m. kg., the rotors 13b and 13c can each produce torques of 50 m.kg. and 100 m. kg. respectively, so that when the three differential valves are opened simultaneously, a maximum torque of 175 m. kg. can be produced by the motor. This motor can be then used, for example, to operate a vehicle having performances approximating those of the vehicle referred to as "Type D" hereinabove, which requires a maximum torque of 350 m.kg., provided that this vehicle is equipped with a two-ratio final drive or differential, one ratio representing twice the value of the other, so that tht maximum torque produced by the motor can be multiplied by two.

A modified embodiment of the hydraulic motor, illustrated in FIG. 8, comprises four vane rotors of the same diameter but having lengths stepped according to the progression 1, 2, 4, 8 for providing increasing torque values stepped according to the arithmetical progression 1, 2, 3.... 13, 14, 15; by giving the shortest rotor of this embodiment the dimensions necessary for producing a 10-m.kg torque, it will be seen that this motor is capable of driving a motor vehicle having performances approximating those of the vehicle of type C hereinabove (maximum torque required = 150 m.kg).

In all the cases contemplated hereinabove and notably for equipping motor vehicles having performances approximating those of the vehicles of types A to G, the power plant according to the present invention has a total weight and a manufacturing cost considerably lower than those of conventional power units comprising notably a high-power internal combustion engine and mechanical transmission means. In addition, vehicles equipped with power plants according to the present invention are extremely easy to drive, since only one pedal is necessary, i.e., the accelerator pedal. Since the motor-pump unit of the power plant of this invention operates constantly at a strictly uniform speed, its power consumption is also constant, notably when starting the vehicle from rest, in contrast to conventional power units in which the starting periods are not only expensive on account of the large amount of fuel required therefor, but also very noisey and characterized by a high degree of atmospheric pollution. The power plant according to the invention is nevertheless capable of supplying higher starting torques than conventional power units.

The specific form of embodiment of the hydraulic motor which is illustrated in FIGS. 8 and 9 of the drawing can be modified in many different ways, as will readily occur to those skilled in the art, without departing from the basic principle of the invention. Thus, the studded cylinder 51 may be replaced by cams rigidly carried by a common shaft and adapted to engage the follower ends 49a to 49c of pivoting levers 48a to 48c. On the other hand, the differential valves and the monitoring valves associated therewith may be replaced by valves responsive to positive valve gears, the valve stems being actuated, for example, directly from pivoting levers such as 48a to 48c responsive in turn to a studded cylinder 51 or equivalent cam means.

In FIG. 5 there is shown diagrammatically in dash lines a rotary pump 59 coupled to the driving shaft 8 of the vehicle and mounted in parallel, via pipe lines 60 and 61, to the pump 10 of the motor-pump unit of the power plant, so as to act as a brake when the hydraulic motor 5 is disconnected from the circuit. In the embodiment shown in dash lines in FIG. 5, this result is obtained by rigidly coupling the rotary pump 59 to the driving shaft 8 of the vehicle and by causing its suction and delivery ports to be connected directly to each other through a pipe line 62 having a valve 63 inserted therein. The movable member of this valve 63 is responsive to the accelerator member of the vehicle (through known means not shown in FIG. 5) whereby said valve 63 remains closed only when said accelerator member is in its fully released condition.

In the modified form of embodiment illustrated in FIG. 10, the shaft 64 of rotary pump 59 is not rigidly coupled to the driving shaft 8 of the vehicle but carries a pinion 66, mounted for loose rotation on this driving shaft, provided with dogs 67 on one face. A sliding hub 68 mounted on driving shaft 8 is responsive to a two-armed lever 69 having a forked end engaged in the circular groove of said hub 68 and its opposite or free end connected, on the one hand, to a return spring 70 and, on the other hand to a link 71, in opposition with each other. Link 71 is attached to the pivoting lever 55a of the accelerator pedal 56 of the vehicle. The dimensions of the various component elements of this assembly are so calculated that the dogs of sliding hub 68 are normally urged and kept in their engaged position with the matching dogs 67 of pinion 66 when the accelerator pedal 56 is released or at rest, i.e., when the pedal spring 57 holds the lever 55a in a position A in which it abuts the member 58, the pump 59 being disconnected from driving shaft 8 after only a slight depression of said pedal 56 which brings its lever 55a to position B and pivoting lever 69 to position B'. In this specific form of embodiment, the lever 55b of accelerator pedal 56 has not caused the studded cylinder 51 to rotate, since the cable 54, retained by a stop 72 remains slack beneath this stop, whereby in said positions B and B' of levers 55a and 69, the hydraulic motor (not shown in FIG. 10) is still disconnected from the circuit and the vehicle can travel freely, since neither a driving torque nor a braking effort is exerted thereon. It is only when the accelerator pedal 56 is further depressed, so as to bring the levers 55a and 69 to positions C and C', respectively, that the lever 55b, by tensioning the cable 54, will cause the cylinder 51 to rotate and thus put the hydraulic motor into circuit.

What I claim is:

1. Power plant for vehicles having a driving shaft, specially for motor vehicles being frequently stopped, comprising at least two tanks for hydraulic fluid, respectively a first high-pressure tank and a second low-pressure tank, at least one first pipe line and one second pipe line inserted between said tanks, at least one control valve adapted to be actuated by the driver of the vehicle and inserted in said first pipe line, at least one hydraulic motor of the positive displacement type, said hydraulic motor having an output shaft, and being inserted in said first pipe line between said control valve and said lowpressure tank, a freewheel coupling inserted between said output shaft of said hydraulic motor and said driving shaft of the vehicle, and at least one motor-pump unit inserted in said second pipe line, said motor-pump having a power rating equal to one fraction of the maximum power output of said hydraulic motor, and being arranged for constantly running at a strictly constant speed, even when the vehicle is temporarily stopped.

2. Power plant as set forth in claim 1, wherein said hydraulic motor comprises a plurality of stages adapted to produce stepped torques, a distributor arranged for connecting a selected number of said stages to said first pipe line under the control of the driver of the vehicle, and a same plurality of separate freewheel couplings respectively inserted between said motor stages and the output shaft of said hydraulic motor.

3. Power plant as set forth in claim 2, wherein said distributor is of the spool valve type.

4. Power plant as set forth in claim 1, wherein said hydraulic motor comprises a cylinder, an output shaft, mounted eccentrically in said cylinder, transverse partitions dividing the inner space of said cylinder into a plurality of rotor chambers, having each an inlet and an outlet respectively connected to a common input and output for the hydraulic fluid, a same plurality of rotors stacked on said output shaft and respectively disposed in said rotor chambers, and a same plurality of freewheel couplings, respectively inserted between said rotors and said output shaft.

5. Power plant as set forth in claim 4, in which the cylinder wall comprises a channel extending in a direction substantially parallel to said output shaft and intersecting with said rotor chamber inlets, and which further comprises a spool valve distributor, placed under the control of the driver of the vehicle, and consisting essentially of a stem slidably mounted in said channel.

6. Power plant as set forth in claim 4, wherein the rotors of said hydraulic motor have substantially the same diameter and stepped widths, respectively, according to a mathematical progression, means responsive to the accelerator of the vehicle being provided for directly connecting the hydraulic fluid input of said hydraulic motor to the separate inlets of a preselected group of rotor chambers.

7. Power plant as set forth in claim 1, which further comprises means responsive to the pressure in said high-pressure tank for automatically adjusting the output of said motor-pump unit, whereby the motor of said motor-pump unit is kept running at a strictly constant speed.

8. Power plant as set forth in claim 1, wherein said motor-pump unit comprises at least one power chamber, supplied with a driving fluid, one pumping chamber with inlet and outlet valve inserted in said second pipe line, and one twin-body free piston, having one body slidably fitted in said power chamber, and the other body movable in said pumping chamber.

9. Power plant as set forth in claim 1, wherein the first tightly closed high-pressure tank contains, in its lower part a predetermined volume of hydraulic fluid and, in its upper part, a buffer volume of at least one substance in the gaseous state.

10. Power plant as set forth in claim 9, wherein said buffer gas volume consists essentially of the vapor of a substance in equilibrium with a predetermined amount of the same substance in the liquid state, said substance being selected among a group of substances having respective vapor tensions considerably higher than the low pressure in said second tank.

11. Power plant as set forth in claim 1, wherein said second tank is kept at the atmospheric pressure.

12. Power plant as set forth in claim 1, wherein said hydraulic motor comprises a single stage, and a variable-ratio transmission is inserted between the output shaft of said hydraulic motor and the driving shaft of the vehicle.

13. Power plant as set forth in claim 6, wherein said connecting means comprise independent valves with respective biasing spring means, said valves being inserted between the hydraulic fluid input of said motor and the respective fluid inlets of the rotor chambers, means for controlling said valves, cam means adapted to actuate said valve controlling means and being carried by a common rotary member, and means for controlling the rotation of said rotary member from the accelerator of the vehicle.

14. Power plant as set forth in claim 13, wherein each valve is of the differential piston type, and comprises a monitoring valve associated therewith, said monitoring valve being opened by said valve controlling means when said means is actuated by said cam means, whereby one face of the differential piston of the corresponding valve is discharged and said valve is opened.

15. Power plant as set forth in claim 9, wherein said buffer gas volume consists essentially of the vapor of a substance in equilibrium with a predetermined amount of the same substance in the liquid state, means being further provided for maintaining said first high-pressure tank at a constant temperature, whereat said substance has a vapor tension considerably higher than the low pressure in said second tank.

16. Power plant as set forth in claim 1, wherein the input of said motor-pump unit is connected to the input of the hydraulic motor through at least one duct comprising a number of branch pipes adapted to be detachably connected to the bottoms of fluid-tight high-pressure tanks.

17. Power plant as set forth in claim 1, wherein a rotary pump is mechanically coupled to the driving shaft of the vehicle, said rotary pump being connected in parallel to the pump of said motor-pump unit, whereby said rotary pump operates as a brake when said hydraulic motor is cut off from said first pipe line.

18. Power plant as set forth in claim 17, wherein said rotary pump is rigidly coupled to the driving shaft of the vehicle, the inlet and outlet of said rotary pump being connected to one another through a pipe line, in which a valve is inserted, the opening of said valve being controlled by the accelerator of the vehicle whereby said valve is closed only when said accelerator is completely released.

19. Power plant as set forth in claim 17, wherein a disengageable coupling is inserted between the shaft of said rotary pump and the driving shaft of the vehicle, the disengagement control members of said coupling being operatively connected to the accelerator of the vehicle, whereby said coupling is engaged only when said accelerator control member is completely released.

20. Power plant as set forth in claim 17, wherein means responsive to the accelerator of the vehicle are provided for operating said rotary pump when said accelerator control member is completely released, for stopping said rotary pump when said accelerator is slightly actuated and for operating said hydraulic motor only when said accelerator is actuated to a greater extent.

* * * * *